United States Patent
Williams

(10) Patent No.: US 10,769,668 B2
(45) Date of Patent: Sep. 8, 2020

(54) REAL-TIME CONSUMER INTERACTION VIA MEDIA BROADCAST

(71) Applicant: VIRTUAL HOLD TECHNOLOGY SOLUTIONS, LLC, Akron, OH (US)

(72) Inventor: Mark J Williams, North Canton, OH (US)

(73) Assignee: VIRTUAL HOLD TECHNOLOGY SOLUTIONS, LLC, Akron, OH (US)

(*) Notice: Subject to any disclaimer, the term of this patent is extended or adjusted under 35 U.S.C. 154(b) by 1035 days.

(21) Appl. No.: 14/247,251

(22) Filed: Apr. 8, 2014

(65) Prior Publication Data
US 2015/0287087 A1    Oct. 8, 2015

(51) Int. Cl.
*G06Q 30/00* (2012.01)
*G06Q 30/02* (2012.01)

(52) U.S. Cl.
CPC ..... *G06Q 30/0267* (2013.01); *G06Q 30/0241* (2013.01)

(58) Field of Classification Search
CPC ........... G06C 30/0241; G06Q 30/0241; G06Q 30/0267
USPC ................................... 705/14.4, 14.73, 14.49
See application file for complete search history.

(56) References Cited

U.S. PATENT DOCUMENTS

| | | | | |
|---|---|---|---|---|
| 8,893,180 B2* | 11/2014 | Barton | ............... | G11B 27/3081 725/109 |
| 2008/0066127 A1* | 3/2008 | Schechinger | ...... | H04N 7/17318 725/106 |
| 2010/0023959 A1* | 1/2010 | Bugenhagen | .......... | G06Q 30/02 725/1 |
| 2012/0288075 A1* | 11/2012 | Williams | ............... | G06Q 10/02 379/93.17 |

* cited by examiner

*Primary Examiner* — Sun M Li
(74) *Attorney, Agent, or Firm* — Brian R. Galvin; Galvin Patent Law LLC

(57) ABSTRACT

A system for integrated consumer interaction via media broadcast, comprising an immediate communication system that communicated with a media provider and a communications system, wherein the consumer submits a request to a content provider for interaction that is then handled by the immediate communication to establish an interaction with a communication system, and a method for providing integrated consumer interaction.

1 Claim, 6 Drawing Sheets

REAL-TIME CONSUMER INTERACTION VIA MEDIA BROADCAST

BACKGROUND OF THE INVENTION

Field of the Invention

The invention relates to the field of consumer advertising and interaction, and more particularly to the field of interacting with a consumer through a media broadcast.

Discussion of the State of the Art

Almost every company today spends a great deal of money on marketing and advertising. Some forms of advertising are relatively cheap, while other forms of advertising, live TV commercials, are very expensive—especially during prime viewing hours or during special events. The goal of TV advertising is really focused around two primary objectives.

One objective is to reinforce the company's brand and awareness in the market to ensure that when a consumer or company may need that product/service they think of them first. This type of focused TV advertising is usually utilized by the major consumer product companies, like BUD-WEISER™, PEPSI™, and others. Their goal to make sure that the next time a consumer is going to purchase a product they provide, that their brand is chosen over the competition.

Another objective for investing in expensive TV advertising is to excite and motivate the consumer to do something "now". This is referred to as "call to action" marketing, and Companies that invest in this type of TV advertising usually display a toll free number on the screen, repeat the number multiple times throughout the commercial, and try to prompt the consumer to pick up the phone and call. Companies that use this type of advertising strategy will look to show their commercial during a type of show (drama, comedy, miniseries, sports events . . . ), and during times that fit the demographics of the type of consumer they are marketing. They also realize that the greatest consumer response to the commercial will happen during, or shortly after the commercial airs—after that, the consumer will usually forget, get distracted, or lose interest in purchasing the product.

Investing in live TV advertising has been the steadfast form of marketing for companies to get their company/brand in front of existing and potential customers. Since most companies are targeting similar consumer profile types, and the prime viewing hours are so expensive that usually only the major brands can afford competing for advertising slots made available by the broadcasters. This makes live TV commercials one of the most expensive forms of advertising/marketing that a company will invest in, and in the case of "call to action" advertising the company will see very little return on their investment unless the consumer watching the commercial immediately contacts them.

The easier a company can make it for a consumer to get in contact with, the more likely it is that they (the consumer) will do what the company is trying to accomplish with the commercial—which is to contact the company. Providing a toll-free telephone contact number takes away any potential toll cost to the consumer associated with calling the company, but it really doesn't make it easier for them and today toll free numbers are viewed as "expected" by consumers. However, calling a company can be viewed by consumers as aggravating, because they have to typically get up from the couch/chair, write down or remember the number, and then grab the phone and dial, and then they know that the call will be answered by an automated system asking them to enter/press numbers. This can be a major deterrent for the consumer to act on their initial reaction to call the company after viewing a commercial. This means that companies are not realizing the full return on their TV advertising investment simply because it is perceived by the consumers as too much effort.

What is needed is a means to integrate consumer contact or interaction with the media broadcasts that contain advertisements intended to target them—thereby alleviating any perceived inconvenience caused by the contact, and expediting the interaction process.

SUMMARY OF THE INVENTION

Accordingly, the inventor has conceived and reduced to practice, in a preferred embodiment of the invention, a system and method for integrating contact queuing methodologies and systems into network broadcasting advertising and programming systems that are linked with the advertising companies sales and service resources, and that may utilize and integrate with the readily available consumer based receiver hardware (such as a remote, "smart" device, and cable/TV box).

According to a preferred embodiment of the invention, a system for integrated consumer contact via media broadcasts, comprising an immediate contact system (ICS) that may be in two-way communication with a plurality of network broadcasters (such as television or radio stations, online content broadcasters such as PANDORA™ or other content broadcasters) and may further be in two-way communication with a plurality of communication systems (such as a contact center), is disclosed. According to the embodiment, a consumer may be viewing content such as (for example) a television advertisement, and may optionally select to interact with a company such as by making a selection via a remote control (as may be utilized with television-based content) or via any appropriate interaction interface according to the nature of content being viewed (such as, for example, via a clickable, or otherwise interactive interface element in a software media application operating on a "smart" device such as a smartphone or personal computing device). For example, a consumer may be viewing an advertisement for a product, and the advertisement may include a prompt for communication such as "press ENTER on your remote now to speak with a representative", and if a consumer wishes to engage in communication, they may begin an interaction as prompted. In this manner, a consumer may have control over whether an interaction takes place, preventing unsolicited contact attempts (such as telemarketing, which is often considered obtrusive and undesired by consumers), and may initiate such contact via any relevant interaction means according to the device being used or content being viewed. Additionally, the invention may be utilized with existing hardware or software for media presentation, making integration and adoption easier for consumers, manufacturers, and content providers.

According to the embodiment, when a consumer makes an appropriate request as described above, a contact request may be sent to an ICS via a messaging service operated by a content provider (such that individual content providers may easily choose whether to enable immediate communication with their broadcasts, for example by enabling or disabling a messaging service), and an ICS may then notify an appropriate communication system, such as an agent within a company's contact center, or may connect a consumer directly according to the nature of a contact request. For example, a consumer may be given a choice such as "connect now" (such as to speak immediately with a company representative) or "request contact" (such as to schedule contact in the future). In this manner, a consumer may be given further control over the manner of contact such as scheduling around their convenience or submitting a preferred contact method ("call me at this number") or other preferences. Should a consumer request a contact, an ICS may notify an appropriate communication system so that contact may be attempted accordingly. Otherwise, the ICS may attempt to connect a consumer directly, such as connecting a call when requested by a consumer from a software application operating on a device capable of communication, such as a smartphone.

In this manner, it may be appreciated that an ICS may operate as a functional connection between content providers and communication systems that may otherwise be separate and disconnected from one another. This may provide a consumer with increased convenience by offering direct interaction capabilities without requiring them to locate or manually input contact information, or even without needing to operate interactive communication systems such as an interactive voice response (IVR) as is commonly utilized by contact centers in the art. When making a request according to the invention, an ICS may submit required information relevant to a contact request that might otherwise have been selected by a consumer via interactions with an IVR. For example, whereas traditionally a consumer might be prompted to select the reason for their call via an IVR, an ICS may notify a communication system accordingly, such as "consumer requests contact regarding product X", saving time and increasing convenience for both consumer and provider.

I will be appreciated that by engaging in two-way communication with media providers and communication systems as described above, an ICS may be given access to relevant information for facilitating the processing of consumer contact requests, such as operating hours or other contact information for communication systems (such as contact centers or personal phone numbers), or information relevant to a consumer that may be provided by a media provider (for example, a provider may already know what device a user is viewing content on, and may provide that information to an ICS for use in determining the best way to handle a contact request). In this manner, by providing as much relevant information as possible to an ICS, the need for manual interaction by a consumer or other party may be minimized and contact may be made more rapid and convenient for all involved parties.

In another preferred embodiment of the invention, a method for integrated contact via media broadcasts is disclosed. According to the embodiment, contact may be provided as an integral feature of media broadcasts such as television advertisements (or any suitable media that may be presented to a consumer), to facilitate rapid and convenient interaction between consumers (such as may be viewing or otherwise consuming media) and a company (or any party that may be providing or otherwise relevant to the media). For example, a consumer may be able to request contact with a company while viewing an advertisement for their product, or may be able to request contact with a radio station while listening to their broadcast, or even request contact with an internet user while listening to or watching media uploaded by that user (Such as a video on YOUTUBE™, for example).

According to the embodiment, in an initial step a consumer may select content for viewing. This content and its viewing may vary in nature, such as listening to an audio broadcast or watching a video, and may vary according to the nature of the media being presented as well as the device it is being presented on (for example, a consumer may not be able to view video content on an audio player device without a screen, but may hear the audio portion of a video broadcast). In a next step, an ICS may be notified of the content selected (and optionally and additional relevant information such as a user's device information or location, such as for determining language preference or local time), and in a substep an ICS may retrieve any stored information that may be relevant, such as previously-established consumer preferences, or information regarding communication systems relevant to the media being viewed (such as contact centers operated by a company providing content, or an email address associated with an internet user that uploaded content being viewed). In a next step a consumer may submit a contact request, such as by selecting an interactive interface element that submits a request, and if needed may additional information (such as contact preferences) may be retrieved and submitted along with a request (for example, a user may manually select or input such information, or it may be retrieved automatically, such as by reading a user's language and time preferences from a smartphone used to submit a contact request). In a next step, an ICS may process this information to determine how to handle a contact request, such as choosing to engage a contact center if a consumer is operating a smartphone, or to schedule a future contact attempt if a request is submitted outside of operating hours, or any other such determination according to information received. In an optional final step, an ICS may return a notification to a media provider for presentation to a consumer, such as to confirm a request was successfully submitted, or to provide any relevant details such as the time of a scheduled contact.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
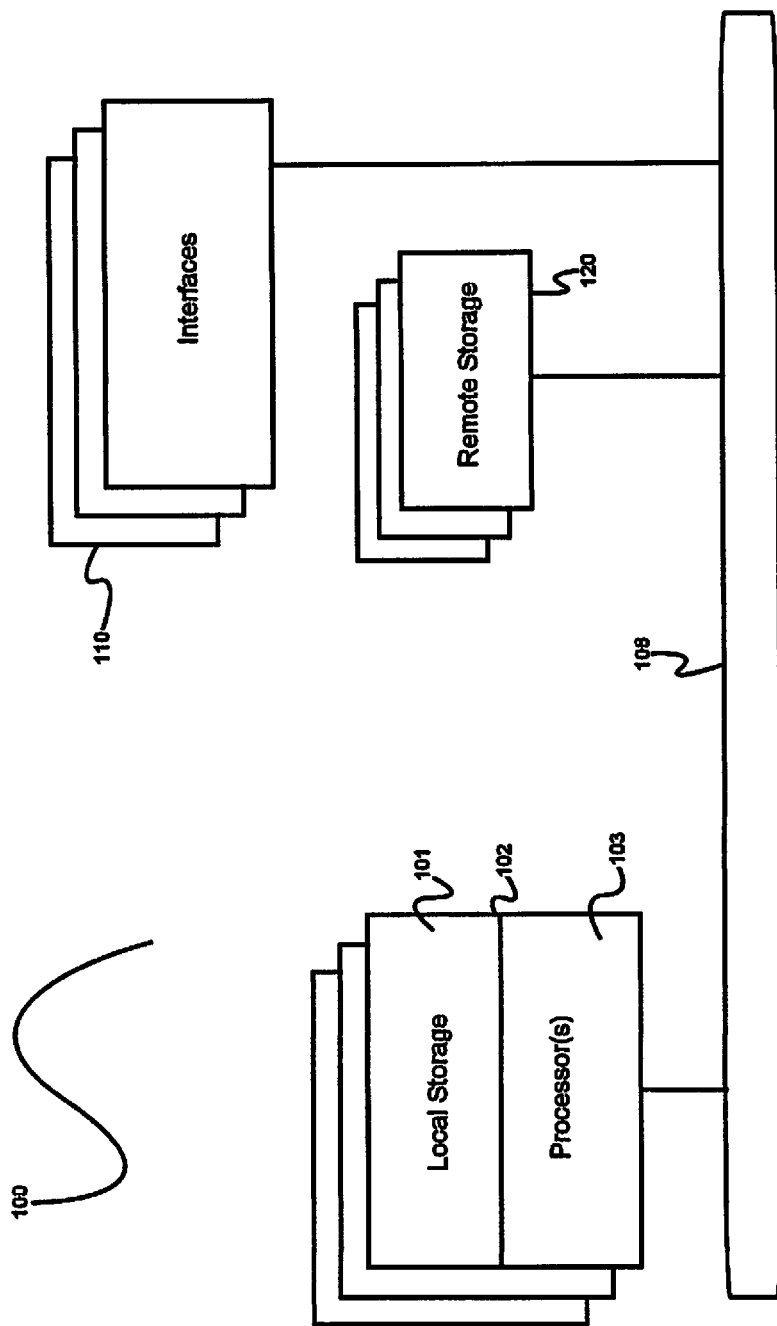
FIG. 1 is a block diagram illustrating an exemplary hardware architecture of a computing device used in an embodiment of the invention.

The inventor has conceived, and reduced to practice, a system and method for integrated consumer contact via media broadcasts.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

A "consumer", as used herein, may be any person or party that may view or otherwise consume media. For example, a consumer may be an individual viewing a television commercial, or a computer user listening to an audio recording over the Internet, or any other appropriate media consumption.

A "provider", as used herein, may be any party that may present media for viewing or consumption by consumers. For example, a provider may be a company providing advertisements via television or other broadcasts, or an individual providing content for viewing over the Internet (such as a video on YOUTUBE™ or other hosting service), or a hosting service providing media on behalf of media creators (such as YOUTUBE™ itself, providing user-uploaded media content).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like. CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
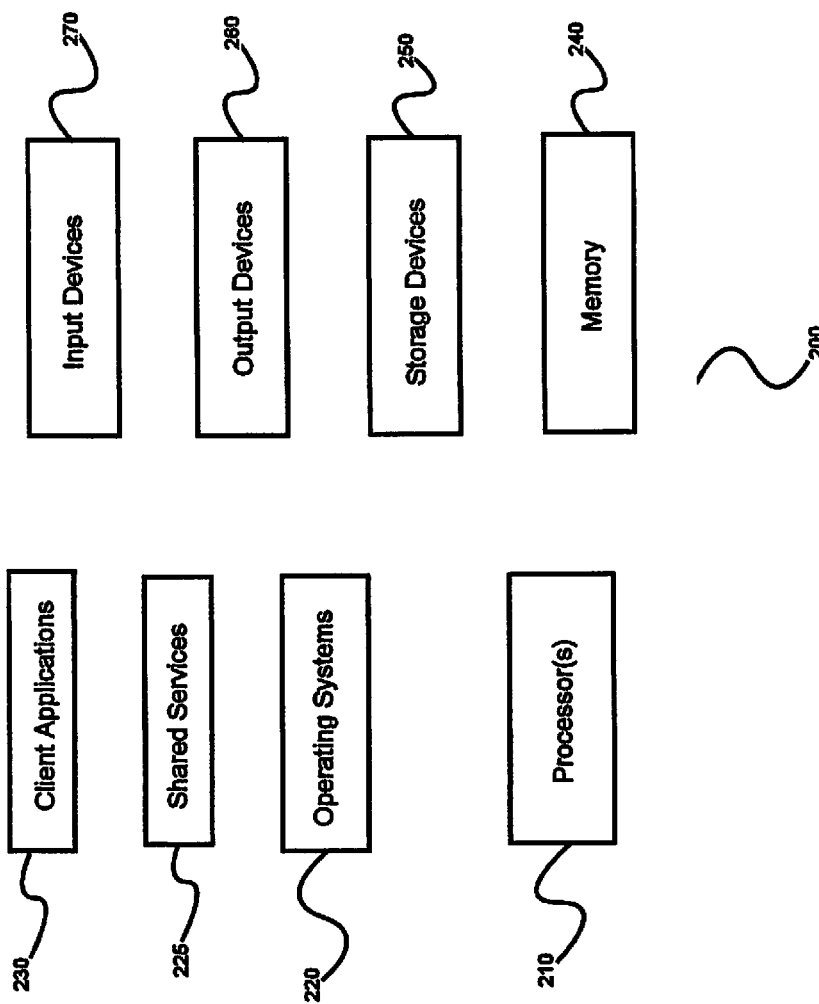
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
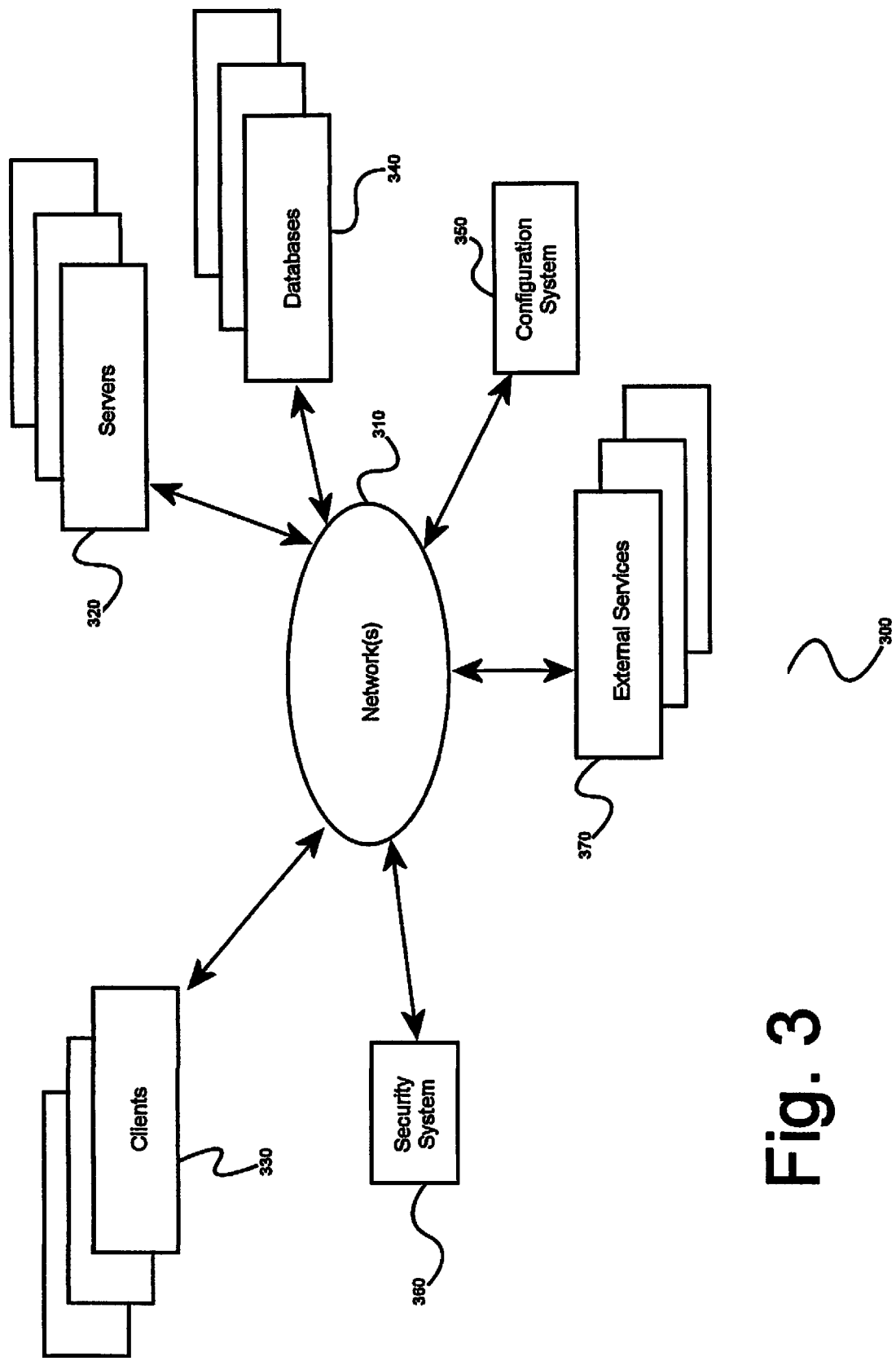
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
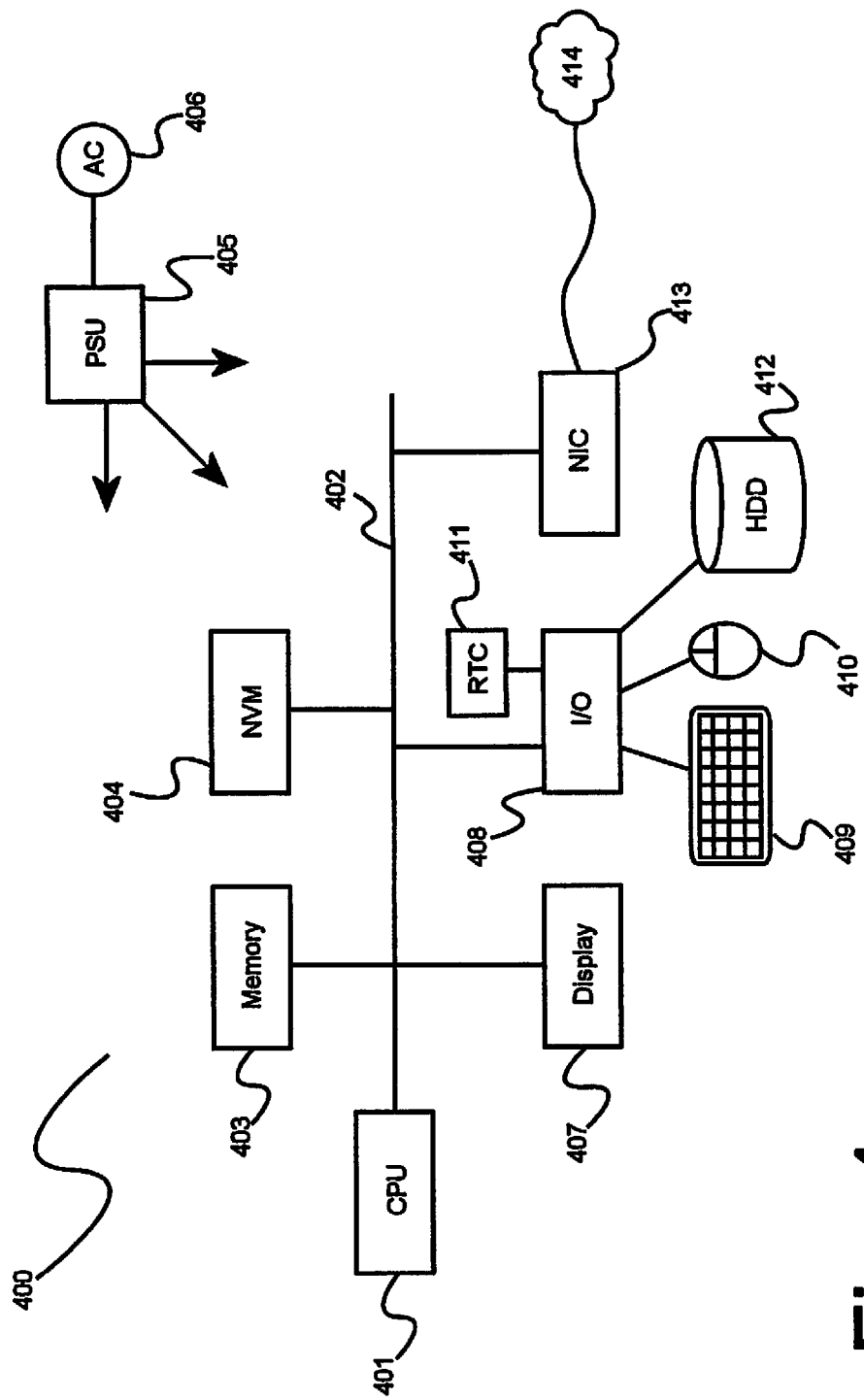
FIG. 4 is another block diagram illustrating an exemplary hardware architecture of a computing device used in various embodiments of the invention.

FIG. 4 shows an exemplary overview of a computer system 800 as may be used in any of the various locations throughout the system. It is exemplary of any computer that may execute code to process data. Various modifications and changes may be made to computer system 800 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
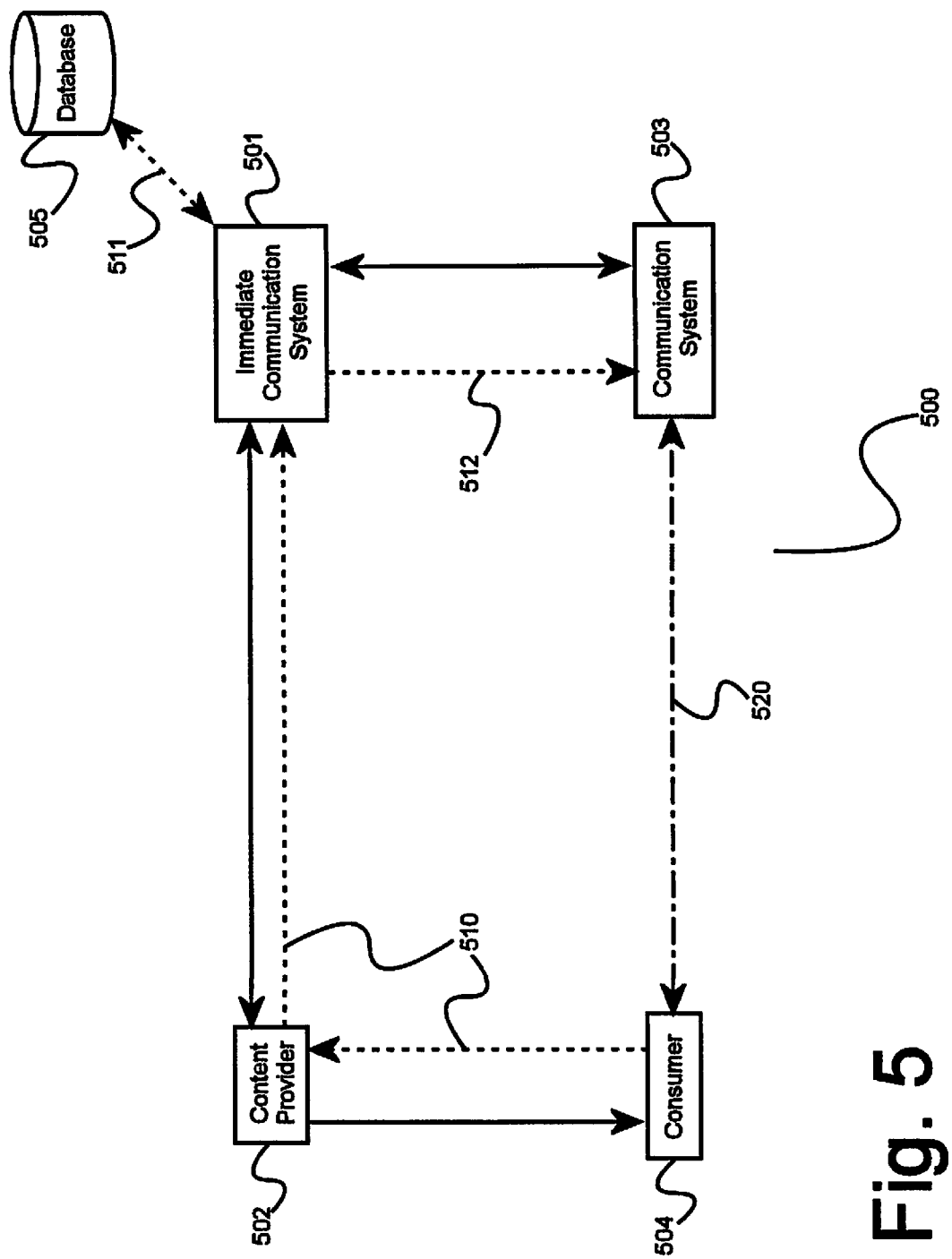
FIG. 5 is a system architecture diagram illustrating an exemplary system for consumer contact integration with media broadcasts, according to a preferred embodiment of the invention.

FIG. 5 is a block diagram of an exemplary system architecture 500 for providing integrated consumer interaction via media broadcasts, according to a preferred embodiment of the invention. As illustrated, a system 500 may comprise an immediate communication system (ICS) 501, that may be any suitable hardware or software component such as a software application operating on a computing device such as a server, or may be a software app operating on a consumer's personal device such as a smartphone or any other device suitable for media consumption or communication. In this manner, it can be appreciated that the functions of an ICS (as described below) may be provided as a service that may add function to existing media consumption (such as by operating on the "backend", adding function to services provided to consumer devices without any modification of those devices or even the consumer's knowledge), or may be provided as a dedicated solution such as a software app that consumers may choose to install on their device, such that they may choose when to utilize the additional functions provided (such as by viewing media through an integrated media consumption and communications app, rather than using an integrated approach with existing media consumption solutions).

As illustrated, an ICS 501 may engage in two-way communications with content providers 502 and communication systems 503 such as contact centers or personal contact means (such as an email or cellular communications provider), and may also be connected to a database 505 (that may be any suitable data storage means, such as physical storage devices or software-based data storage means as are common in the art). As further illustrated, content providers 502 may present media to consumers 504 for viewing, such as providing broadcasts of audio, video, or other media content for consumption. It should be appreciated that all connections shown may vary in nature such as being remote connections via the Internet or similar data communications network, or may be direct connections such as systems operating on a local area network (LAN) via wireless or direct physical connections interchangeably, and that such connections are shown in an abbreviated form for the sake of illustration clarity.

Consumers may be able to send requests 510 to content providers, such as to request communication with parties relevant to media being viewed (such as requesting to contact a company while viewing an advertisement about a product or service they offer). These requests may be passed to an ICS, optionally with additional information that may be relevant to a request (such as information regarding a consumer's locale or device information), for handling. Additionally, an ICS 501 may communicate with a database 505, such as to retrieve 511 information that may be relevant to request handling (such as previously-established consumer information, for example communication preferences or other information that may be relevant to interactions or their handling). An ICS may then communicate 512 with a communication system 503 to complete a request, such as to establish communication with them on behalf of a consumer (such as sending an email notification when requested), or to request interaction with a consumer (such as requesting that a contact center place a call to a consumer's contact number, optionally scheduling a preferred time for interaction or setting other preferences). When a communication system 503 receives this information and any requisite conditions are met (such as a consumer's preferred contact time or an agent is available in a consumer's preferred language), they may establish a two-way communication with a consumer (such as completing a call connection, or placing an outbound call to a consumer's phone).

In this manner, a request may be completed and a consumer may interact with a desired party without ever needing to contact them directly, or even without knowing any of their contact information (such as submitting a request to speak with an agent on behalf of a company, without actually knowing or entering any contact information about that company). Such contact information for participants (i.e., consumer 504 and communication system 503) may be ascertained by an ICS 501 via communication with the systems or entities involved, and may be stored in a database 505 to expedite future operations.

Detailed Description of Exemplary Embodiments

Figure 6:
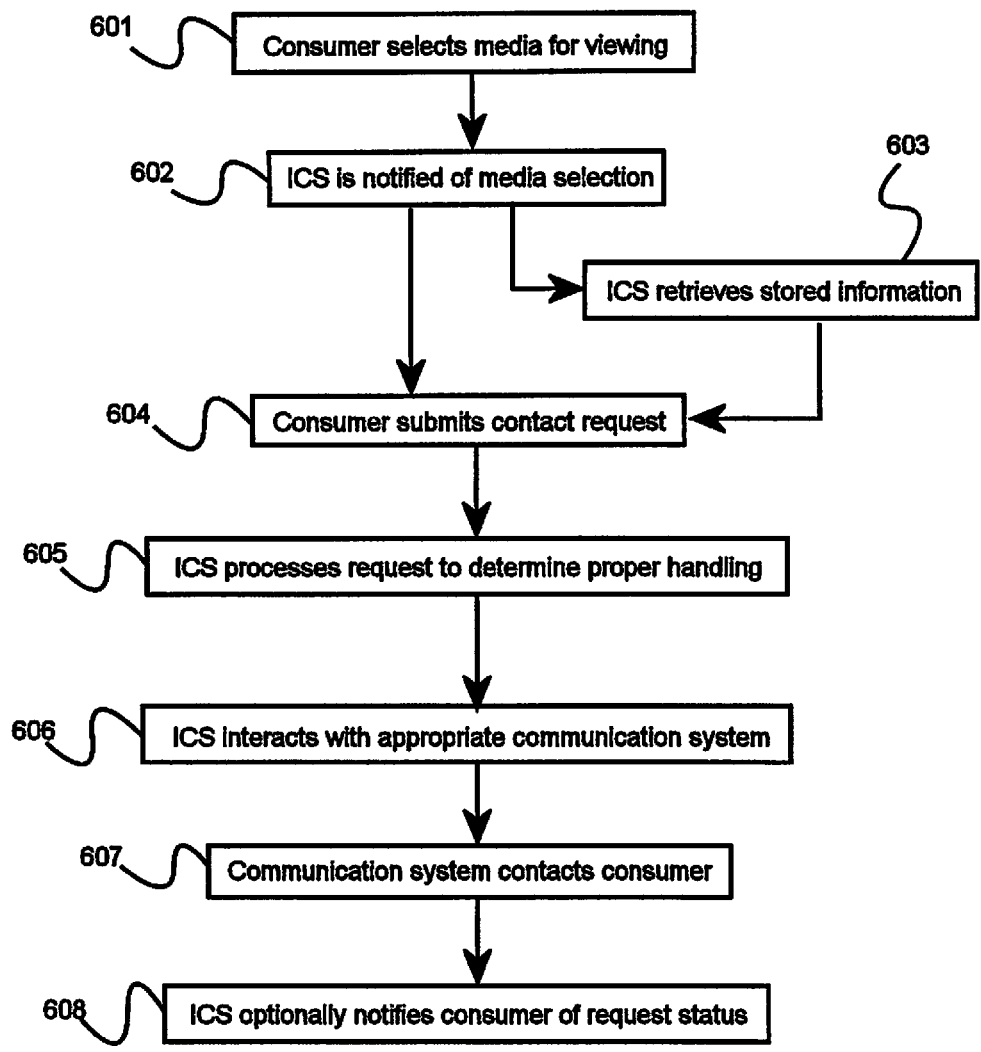
FIG. 6 is a method flow diagram illustrating an exemplary method for providing consumer contact integrated with media broadcasts, according to a preferred embodiment of the invention.

FIG. 6 is a method flow diagram illustrating an exemplary method 600 for integrated consumer contact, according to a preferred embodiment of the invention. As illustrated, in an initial step 601 a consumer may select content for viewing, such as listening to an audio broadcast or watching a video. In a next step 602, an ICS may be notified of the content selected (and optionally any additional relevant information such as a user's device information or location, such as for determining language preference or local time) by a content provider, and in a substep 603 an ICS may then retrieve any known information that may be relevant, such as previously-established consumer information (such as language, location, preferred time or methods of contacts, or any other such information relevant to a particular consumer), or known information regarding communication systems or other information relevant to the particular media being viewed, such as contact centers operated by a company providing an advertisement, or an email address associated with an internet user that uploaded content being viewed. In a next step 604 a consumer may submit a contact request, such as by selecting an interactive interface element that submits a request, and if needed may additional information (such as contact preferences or device information) may be retrieved and submitted along with a request (for example, a user may manually select or input such information such as by filling out a form or answering prompts during request submission, or it may be retrieved automatically, such as by reading a user's language and time preferences from a smartphone used to submit a contact request). In a next step 605, an ICS may process this information to determine how to handle a contact request, such as choosing to engage a contact center if a consumer is operating a smartphone, or to schedule a future contact attempt if a request is submitted outside of operating hours, or any other such determination according to information received. In a next step 606, an ICS may communicate with a communication system appropriate to the particular request being handled, such as establishing a connection with a contact center and providing a consumer's request information to facilitate the contact center's handling of a call with the consumer (for example, information that might traditionally be obtained by prompting a consumer to make selections via an IVR when calling). In a next step 607, a communication system may complete an interaction such as by communicating directly with a consumer, or by acknowledging a request such that an ICS may then connect the consumer (such as, for example, if a consumer submitted a request for a call via a smartphone app, and subsequently waited on their phone for the request to be handled and the call to be answered by a contact center agent). In an optional final step 608, an ICS may optionally return a notification to a media provider for presentation to a consumer, such as to confirm a request was successfully submitted, or to provide any relevant details such as the time of a scheduled contact.

In this manner, it can be appreciated that a variety of potential interaction types may be possible according to the invention, and may accommodate a wide variety of consumer needs, devices, communication means, and media types. For example, during viewing of a television advertisement a consumer might be prompted to press a button on their remote control to request a call from a company regarding the product or service being advertised. Upon submitting this request, the consumer's television provider might provide their phone number (as may have been used to establish their television service) to an ICS, which may then provide this information to a contact center for handling by an agent. An appropriately-skilled contact center agent (such as trained in the operation of the product in the advertisement) may then receive this request, and place a call to the consumer's telephone number, completing the interaction.

Another example might be an individual listening to a streaming audio service on their smartphone, such as via PANDORA™ or other streaming audio service provider. The consumer might hear an advertisement between songs, and press a button on their streaming app to submit a request for more information regarding a product or service that was advertised. The request may be automatically populated with additional information that may be obtained from the consumer's device, such as their location, language preference, various contact information such as email address, alternate phone numbers, or even a physical address (any combination of which may be stored within a smartphone or similar mobile communications device common in the art). The request may then be submitted to a known communication system for the company in the advertisement, such as an email address placed on file specifically for handling requests made through their PANDORA™ ads. The company may then, upon receipt of the request and review of the information contained, choose to send a product catalog to the consumer's physical address that was obtained from their device, as well as schedule a follow-up phone call an appropriate amount of time in the future to discuss the products with the consumer after they have had an opportunity to review the catalog sent.

In this manner, it can be appreciated that the invention may be readily adapted to any combination of media, consumer preference, or physical device used by the consumer, and furthermore that existing devices and services may utilize the functionality of the invention with little to no alteration—for example, PANDORA™ streaming audio broadcasts may already contain a variety of metadata such as artist information for songs being played, and information relevant to the operation of the invention (such as contact information for companies being advertised) may be included by populating fields already present but unused. In this manner, existing services, devices, and standards may be easily integrated to provide the functions of the invention, and integration may take place without any disruption of consumer experience. Furthermore, integration may be seen as optional—some companies may choose to offer the functionality of the invention, while others may choose not to, and both may offer their advertisements interchangeably via similar media providers and to similar consumers and devices, allowing for gradual or "piecemeal" adoption, rather than forcing integration and potentially causing issues such as (for example) companies withdrawing from particular media providers due to a desire to avoid the costs of integration.

The skilled person will be aware of a range of possible modifications of the various embodiments described above. Accordingly, the present invention is defined by the claims and their equivalents.

What is claimed is:

1. A system for integrated consumer interaction, comprising:
    a media player application installed on a consumer device, the media player application comprising a first plurality of programming instruction stored in a memory of, and operating on a processor of, the consumer device; and
    an integrated communication server comprising a memory, a processor, and a second plurality of programmable instructions stored in the memory of, and operating on the processor of, the integrated communication server;
    wherein the first plurality of programming instructions, when operating on the processor of the consumer device, cause the consumer device to:
        request, receive, and store contact and preference information from a user in a data storage operating as a component of the consumer device;
        receive media content from a content provider;
        identify the media content and contact information for a company associated with the media content using metadata associated with the media content;
        play the media content on the consumer device;
        while the media content is playing, display an interactive interface element within a graphical user interface operating on the user's consumer device, the user interface element generated in real time based on metadata associated with the media content being played;
        connect via a network to the integrated communication server; and
        upon receipt of a user command via the interactive interface element:

automatically retrieve real-time consumer context data comprising at least location, activity, and language preference data from the consumer device based on the media content being played, its associated metadata and the current local time on the consumer device;

retrieve consumer contact and preference data from the data storage;

automatically generate an electronic callback request comprising the metadata associated with the media content, the retrieved real-time consumer context data, and the retrieved consumer contact and preference data; and automatically send the callback request to the integrated communications server;

wherein the second plurality of programming instructions, when operating on the processor of the integrated communication server, cause the integrated communication server to:

receive connections via a network from the media player application, the connection being prompted by the user's interaction with the interactive interface element displayed by the media player software on the consumer device; and for each such connection:

receive the company contact information, the media content identification, and the user's contact and preference information;

receive a callback request from the consumer device, the callback request comprising the metadata associated with the media content, the retrieved real-time consumer context data, and the retrieved consumer contact and preference data, from the media player on the consumer device;

automatically schedule a callback to the user of the consumer device based at least on the metadata specific to media content being played on the user device and on the received contact and preference information; and when scheduled, automatically place a telephone call to the consumer device and to a call center agent appropriately skilled to handle the specific callback request, thereby establishing a two-way voice connection between the user of the consumer device and a selected call center agent.

\* \* \* \* \*